May 16, 1944. J. H. RICHARDS 2,349,199
ALL ANGLE MILLING MACHINE ATTACHMENT
Filed Feb. 16, 1940 2 Sheets-Sheet 2
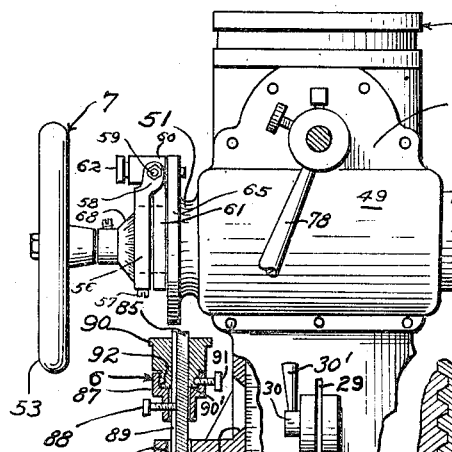
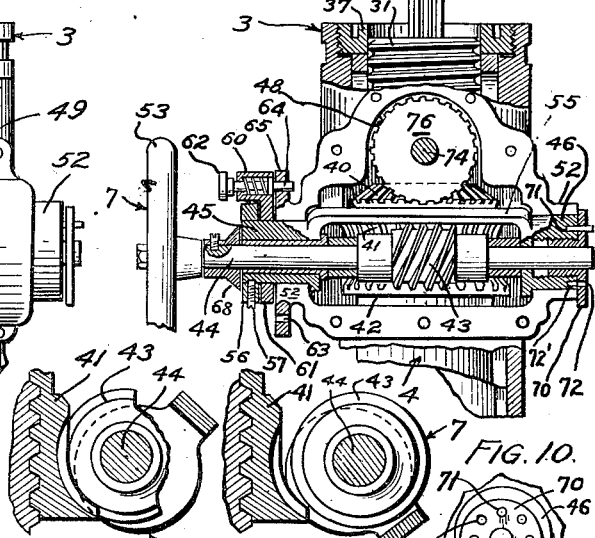
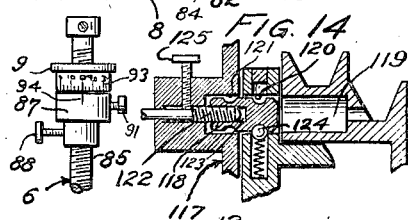
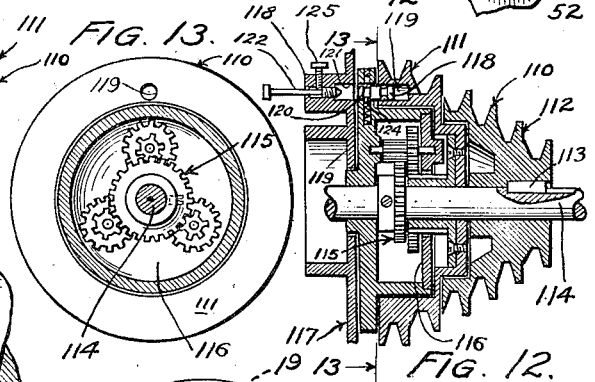
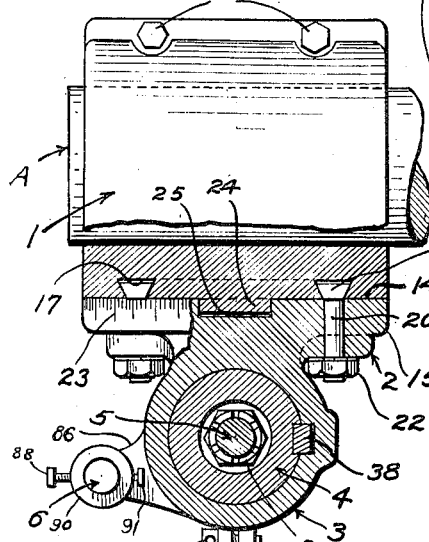
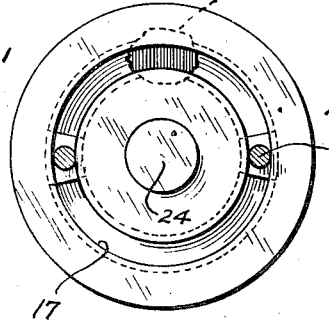
INVENTOR.
JAMES H. RICHARDS
BY Luther L. Mack
ATTORNEY.

May 16, 1944.  J. H. RICHARDS  2,349,199
ALL ANGLE MILLING MACHINE ATTACHMENT
Filed Feb. 16, 1940  2 Sheets-Sheet 1
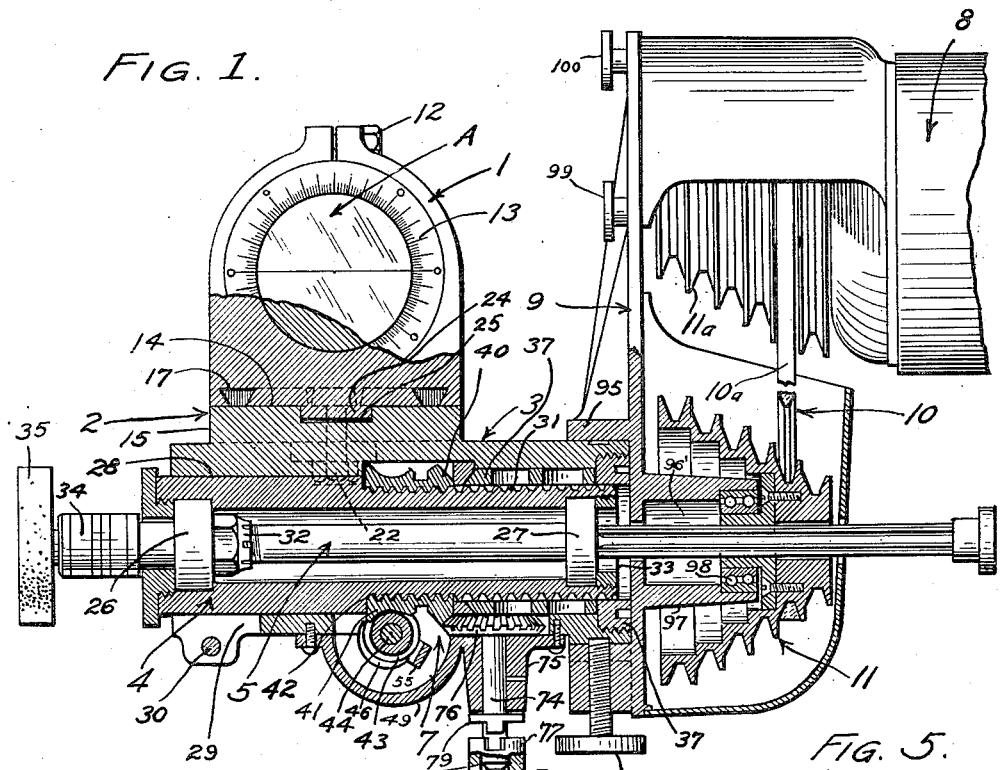
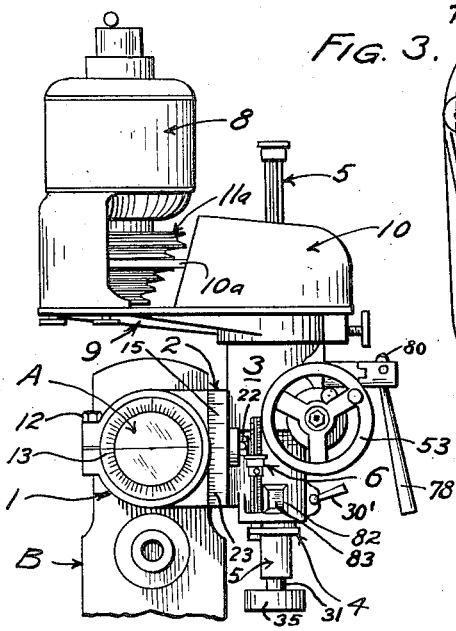
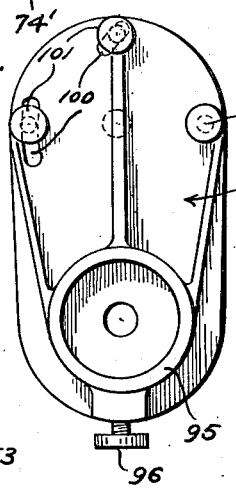
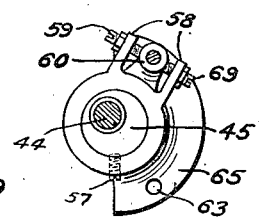
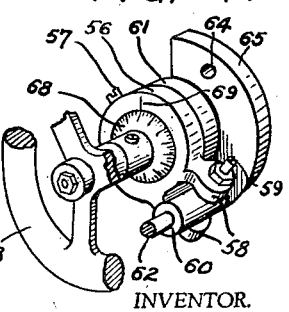
INVENTOR.
JAMES H. RICHARDS
BY
ATTORNEY.

Patented May 16, 1944

2,349,199

UNITED STATES PATENT OFFICE 2,349,199

ALL-ANGLE MILLING MACHINE ATTACHMENT

James H. Richards, Glendale, Calif., assignor to Fray Machine Tool Co., a corporation Application February 16, 1940, Serial No. 319,290

2 Claims. (Cl. 90—16)

My invention relates to and has for an object the provision of an improved all angle, full universal milling attachment which is adapted to be mounted on the overarm of a milling machine, and is capable of many and certain micrometric operations heretofore impossible of performance with other types of milling attachments, and moreover, is subject to a more convenient, accurate and efficient use in any of its possible positions and operations.

One of the important purposes of my invention is the provision of an attachment of the character described wherein the major axes of adjustment and the parts and elements thereof are so constructed, compactly arranged and closely coupled as increase the strength and stability of the attachment without sacrificing the full universal and all angle adjustments and primarily, to insure accuracy of work in all positions.

One of the important features of my attachment is the provision of an improved quill arrangement by means of which the tool may be fed to the work at all angles and positions in a much more convenient and accurate manner than heretofore possible.

Another important provision of my invention is that of a novel stop means for limiting the feed and particularly the depth of feed of the tool in a most accurate and efficient manner.

Another purpose of my invention is to provide an attachment of the character described in which independently and selectively operable feed means for the quill will make possible accurate and micrometric feeding of the tool to the work to best suit the particular work at hand and many milling operations not otherwise possible.

A further purpose is to provide an attachment of the character described which may be readily and easily disposed in an out of the way position when it is desired to use the milling machine proper, exclusively of the attachment.

Another purpose of the invention is to provide a milling machine attachment of the character described which includes an improved construction of the spindle housing and mounting means therefor, which latter provides a rotative joint on a horizontal axis close and at right angles to the axis of the overarm to facilitate an accurate positioning of the attachment at any angle desired.

Among other features of improvement my invention includes the advantages of such added stability and strength as to enable the work to be finished in one operation or cut, and also provides for a highly desirable micrometric feed whereby small and other work may be accomplished in a highly satisfactory manner. Again, the attachment makes possible grinding, lapping, and drilling and many other operations by reason of the stability, ruggedness, adjustments and feeding provisions as hereinbefore pointed out, and is further improved in that all wearing parts may be properly adjusted to compensate for wear in a particularly novel manner.

With the foregoing and other objects in view, my invention consists in the particular construction of combination and relative arrangement of the parts and elements as shown in the accompanying drawings, described in the following specification and finally defined in the claims hereto appended. It is to be understood that minor changes as to size, proportion and arrangement of parts and elements of the invention may be made as required without departing from the spirit and scope of the invention as set forth in the claims hereof.

In the drawings:

Fig. 1 is a fragmentary sectional and partial elevation of the attachment of my invention particularly showing the novel quill and feeding means therefor, the spindle being horizontally disposed;

Fig. 2 is a front elevation of the complete attachment embodying my invention, as when the spindle is vertically disposed;

Fig. 3 is an elevational view showing the belt tightening and belt changing of the attachment;

Fig. 4 is a fragmentary perspective view of a part of the quill feeding mechanism;

Fig. 5 is a fragmentary elevation of the mechanism shown in Fig. 4;

Fig. 6 is a fragmentary side elevation of the spindle housing particularly showing, a novel stop means for regulating the feed of the quill, parts of said means being in section;

Fig. 7 is a fragmentary and partly sectioned elevation of the housing and means as shown in Fig. 6, with the cover plate removed;

Fig. 8 is a fragmentary sectional view of the worm feed for the quill as when in operative position;

Fig. 9 is a view similar to Fig. 8 showing the worm feed as when inoperative;

Fig. 10 is a fragmentary elevation of the end play adjustment means for the worm feed shaft;

Fig. 11 is a fragmentary elevation of the setting means for the stop for controlling the feed of the quill;

Fig. 12 is a sectional view of the variable speed cone pulley unit;

Fig. 13 is a sectional view taken on the plane of line 13—13 of Fig. 12;

Fig. 14 is an enlarged fragmentary sectional view of the control means for the variable speed cone pulley;

Fig. 15 is a fragmentary top plan view showing the mounting means for spindle housing, parts being sectioned for clarity of illustration;

Fig. 16 is a fragmentary elevation view of detailed parts of the mounting shown in Fig. 15.

In the accompanying drawings I have shown in detail one embodiment of the milling attachment of my invention as mounted on the overarm A of a milling machine B, so as to be fully universally movable and positioned at all angles relative thereto.

Generally the attachment of my invention includes an improved adapter sleeve 1 rotatably mounted on the overarm A, a novel mounting or attaching means 2 for adjustably joining the spindle housing 3 to the adapter sleeve, an improved adjustable quill 4 for the spindle 5, an improved micrometric stop means 6 for controlling the feed or adjustment of the quill, a novel feed or adjusting mechanism 7 for the quill, a motor 8 supported on an extension arm 9 of the spindle housing, a cone pulley drive means 10 including a belt 10a and variable speed cone pulleys 11 and 11a and other features and constructions which will be hereinafter more fully described.

The adapter sleeve 1 as shown in Figs. 1 and 15 is split and mounted on the overarm A so as to be rotatable thereon throughout 360 degrees and adjustable axially thereof as desired. Clamping bolts 12 provide for securing the sleeve in the desired position of adjustment as is customary in the art. One end of the sleeve is provided with a circular series of calibrations 13 for cooperation with an indicating mark on the adjacent end of the overarm to facilitate accurate setting of the attachment at the desired position or angle.

The novel means for adjustably mounting the spindle for rotation throughout 360 degrees on a horizontal axis at right angles to the axis of the sleeve, is shown in Figs. 1, 15 and 16 and includes a flat face 14 on one side of the sleeve 1 and a cooperating plate-like member 15 formed integral with one side of the spindle housing between the ends of the latter. The outer face of the member 15 engages the flat face 14 which latter is formed with an annular dovetailed groove 17. The sleeve 1 is provided with an opening 19, see Fig. 16, which communicates with the groove 17 whereby bolts 20 may be positioned with their dovetailed heads 21 slidably mounted in the dovetailed groove 17 and their shanks inserted through the plate like member 15 as best seen in Fig. 15. Nuts 22 provide for securing said bolts in place whereby to hold the spindle housing on the sleeve 1 for adjustment relative thereto as aforementioned. These nuts are readily accessible to the operator as will be apparent from Fig. 15 and provide for clamping the spindle housing to the sleeve to maintain desired adjustments. The member 15 is of circular form and is calibrated as at 23 on its periphery to facilitate desired accurate adjustment of the spindle housing and associated parts about the axis of the joint between the sleeve and said housing. It is important to note that the spindle housing is close coupled to the sleeve and overarm whereby the major axes of adjustment of the attachment are brought close together, the attachment is made stronger and more compact and stable, and a greater accuracy of operation thereof is thus assured. The efficiency of the joint between the sleeve 1 and spindle housing is increased by the provision of a centering bearing boss 24 provided on the sleeve for engagement in a bearing socket 25 in the member 15 on the housing.

Adjustable axially in the spindle housing is a quill 4 which supports bearings 26 and 27 for the spindle 5 and provides for extension and retraction of the spindle with respect to the housing for feeding the tool to the work or positioning the tool as desired. The outer end portion of the quill has a seated fit as at 28 with the corresponding portion of the housing which is split as at 29 whereby a clamping screw 30 operated by lever 30' may be operated to releasably hold the quill against movement relative to the housing. For most of its length, however, the quill is reduced and screw threaded exteriorly as at 31. The bearing 26 is held seated in a counterbore at the outer end of the quill by means of a nut 32 screwed onto spindle 5 whereas the bearing 27 is similarly held in the inner end of the quill by means of an annular plug 33 screwed into the end of said quill (see Fig. 1). The spindle 5 extends beyond the nut 32 and is provided with a suitable chuck 34 for holding a tool such as the one 35 shown in Figs. 1 and 2. The inner end of the quill is adjustable in a bushing 37 which is screwed into the corresponding end of the spindle housing as shown in Fig. 1. As shown in Fig. 15 the quill is splined as at 38 in the spindle housing so that it may be extended and retracted without turning relative to said housing.

The feeding or adjusting means for the quill includes a beveled drive pinion 40 threadedly mounted on the screw threaded portion of the quill as shown in Fig. 1, so that when rotated the quill will move axially of the housing. This drive pinion is carried by a worm gear 41 bearing against a shoulder 42 on the quill and adapted to be operated by a worm 43 on a shaft 44 supported in eccentrically adjustable bearings 45 and 46. The shaft and worm are mounted in an open side 48 of the spindle housing as shown in Fig. 7, but are enclosed by a removable cover plate 49 as shown in Fig. 6. The bearings for the worm shaft are supported in extensions 51 and 52 of the housing and cover plate. The open side of the housing permits of assembling and disassembling of the quill feed means particularly the gears thereof, when the cover plate is removed as shown in Fig. 7.

On one end of the shaft 44 is a hand wheel 53 for turning the shaft whereby through the worm gearing, the drive pinion will be rotated to feed the tool to the work.

The worm feed mechanism for the quill is rendered operative and inoperative by turning the eccentric bearings 45 and 46 in such manner that the shaft 44 and worm 43 are moved towards and away from the worm gear 41 as best shown in Figs. 8 and 9. When the worm 43 is moved towards the gear 41, it will drivingly engage it as shown in Fig. 8, and when reversely moved it will be disposed out of driving position as shown in Fig. 9. In this connection it is seen that the bearings 45 and 46 are connected to one another for simultaneous movement by means of a bar 55.

The bearings 45 and 46 are turned or moved for rendering the worm gearing operative and inoperative by means of a ring 56 secured on the bearing 45 by means of a set screw 57 as shown in Fig. 4. The ring 56 is provided with opposed ears 58 having adjustable stop screws 59 thereon adapted to engage opposite sides of a detent barrel 60 which latter is carried by a free ring 61 surrounding and rotatable relative to bearing 45 (see Figs. 4 and 5, 6 and 7). A spring loaded detent 62 is carried by the barrel 60 and is adapted to seat in openings 63 and 64 in a plate 65 fixed to the spindle housing. When the detent is seated in the lower opening 63, the bearings 45 and 46 are so positioned as to dispose the worm 43 out of mesh with the worm gear 41 as shown in Fig. 9. To set the worm feed for operation, the detent is pulled out of the opening 63 and swung upwardly as permitted by the free ring 61 and due to the engagement of the barrel 60 with the stops 59 on the ring 56, the latter will be turned whereby both the eccentric bearing will be turned and the shaft 44 will be moved so that the worm 43 thereon will mesh with the gear 41 as shown in Fig. 3. At the time the gears come into mesh the detent will snap into the upper opening 64 whereby to hold the gears in mesh. It is seen that the detent is retracted from the opening 64 and moved downward to seat in the opening 63 for the purpose of disengaging the worm 43 from the gear 41, the eccentric bearings being turned due to such movement of the detent and thereby moving the shaft 44 and worm gear 43 into the inoperative position shown in Fig. 9.

It should now be noted that the worm feed mechanism of my invention will provide for an accurate micrometric feeding of the tool to the work by extending the quill with the spindle supported thereby as hereinbefore pointed out. The ring 56, the free ring 61, adjustable stops 59 and associated parts make possible adjustments of the worm gearing to the desired meshing in compensation for wear or for controlling the feeding operation of the worm feed. On the worm shaft 44, in a position clearly visible to the operator as shown in Figs. 4, 6 and 7, is a calibrated dial 68 the calibrations of which are readable against a mark 69 on the bearing carried ring 56. This will facilitate an accurate micrometric feeding of the tool.

As shown in Figs. 6 and 7 and 10, the end bearing 46 is axially adjustable to regulate end play of the shaft 44. A flanged bushing 70 is freely rotatable on the shaft 44 and threaded into the bearing 46, the flange thereof abutting the extension 52 of the spindle housing. Rotation of this bushing will cause axial movement of the bearing 46 whereby to control end play of the shaft 44. A set pin 71 is inserted into alined openings 72 and 72' in the flange and bearing respectively, for locking the bearing to the flange. This pin is removed when the bearing 46 is to be adjusted.

I have also provided a lever operated feed mechanism for the quill whereby the tool may be fed to the work. This mechanism includes a shaft 74 mounted in a bearing 75 on the spindle housing as shown in Figs. 1, 2, and 6 and a beveled gear 76 fixed on the shaft so as to be in constant mesh with the drive pinion 40 (Figs. 1 and 7). A clutch member 77 is axially adjustable and freely rotatable on the reduced outer end 74' of the shaft 74 and supports an operating lever 78. This lever is inoperative to turn the shaft until pushed inwardly so that the clutch member 77 is engaged with a clutch member 79 fixed on the shaft. The clutch 77 is held in its operative and inoperative positions by a set screw 80 as shown in Fig. 1, arranged to engage in annular grooves 81 in the shaft, so that the latter may turn freely. When the worm feed is used the lever is locked in inoperative position as shown in Fig. 1 and although the shaft will rotate relative to the clutch member 77, the lever will not be turned. When in operative position the lever provides for rotating the shaft and operating the gears 76 and 41 to feed the tool as desired, the worm gearing being disengaged when the lever operated feed is employed.

An opening 82 is provided in the spindle housing for rendering visible a graduated scale 83 on the quill whereby the feed of the quill may be gaged as desired. This is shown in Figs. 2 and 6.

The micrometric stop means 6 for controlling the feed of the quill and tool, as here employed comprises (Figs. 2, 6 and 11) a lateral extension 84 on the outer end of the quill, to which extension is fixed a screw 85 paralleling the spindle housing and movable in an opening 85' in a stop lug 86 on said housing. This screw travels with the quill and is provided with a stop sleeve 87 adjustably supported thereon for contacting the stop lug 86 to limit the outward extension of the quill as per the setting of the sleeve. A set screw 88 provides for holding the stop sleeve in set position (see Figs. 6 and 11) and is engaged in a groove 89 in the screw so that when loosened permits of axial movement of the sleeve on the screw but holds the sleeve against turning. Since the sleeve is not threaded I provide an operating nut 90, threaded on the screw and relatively rotatably coupled with the sleeve by means of a set screw 91 mounted on the sleeve engaged in an annular groove 92 on the reduced lower end 90' of the nut, said nut being seated in a counterbore of the sleeve. The stop sleeve will be moved with the nut and may therefore be disposed in the desired position to limit the depth or extent of feed of the tool. The nut is provided with calibrations 93 (Fig. 11) readable against a mark 94 on the sleeve whereby to accurately set the stop sleeve.

As particularly shown in Fig. 1, the arm 9 has a hub portion 95 on one end rotatable on the inner end of the spindle housing and adapted to be held against rotation by means of a set screw 96. The spindle 5 is extended freely through a passage 96' in a bearing supporting boss 97 on said arm and is splined to the pulley 11 which latter is mounted on a bearing 98 carried by the boss. The other pulley 11a is mounted on the motor 8 which is adjustably mounted on the outer end of the arm 9 for purposes of changing or tightening the belt in a manner well known in the art. The motor is pivoted at 99 on the arm and by means of the slots 100 and screws 101 may be swung in an arc to provide for changing the belt and tightening it. The rotative connection of the arm 9 with the spindle housing provides for disposing the motor-belt-pulley drive unit in the best position to suit the particular work at hand.

It will now be seen that by reason of the sleeve mounting on the overarm, the attachment may be rotated through 360 degrees relative to said arm and that by reason of the rotative joint with said sleeve providing an axis at right angles to the axis of the overarm, I may secure other adjustments through 360 degrees of arc and may therefore dispose the spindle at all angles and positions as desired to best apply the tool to the particular work. An important provision is that of feeding the tool to the work in an all angle full universal attachment such as I have provided, and the accomplishment of this by means of an axially adjustable quill which also reinforces the machine and improves the operation thereof. The selective feed device operated by the hand wheel 53 and lever 78 respectively, make possible a much more advantageous use of the attachment with greater accuracy of performance than is possible by other known devices.

As shown in Figs. 12, 13 and 14, I have provided a modified form of variable speed cone pulley 110 consisting of two pulley sections 111 and 112. The section 112 is keyed as at 113 to the spindle 114 and has one or more belt grooves, whereas the section 111 likewise has a plurality of belt grooves, and is coupled with the shaft independently of the section 112 by means of planetary gearing generally designated 115. This planetary gearing is disposed within the hollow interior of the pulley section 111, and has certain gears fixed to said section and others supported on a plate-like member 116 which is loosely mounted on the shaft 114.

The member 116 is disposed between the motor supporting arm 117 (corresponding to arm 9) and the pulley section 111 so that it may be coupled to the supporting arm 117 independently of section 111, to render the planetary gearing operative for controlling the speed of the pulley section 111, or may be coupled to the section 111 independently of the arm 117 to render the pulley sections operative in the usual manner, independently of the planetary gearing except that said gearing then acts as a coupling means for the two pulley sections without modifying the speed.

A clutch pin 118 is slidable into and out of a socket 119 in the pulley section 111 so that it may be disposed in position, shown in Fig. 12, for coupling the member 116 with said pulley section, or may be moved into position shown in Fig. 14 for coupling the member 116 with the motor supporting arm 117 whereby the member 116 is held against turning and the planetary gearing becomes operative for controlling the speed of the pulley section 111. As here provided, an opening 120 is provided in the member 116 for reception of the clutch pin 118 and a socket 121 is provided in the arm 117 for reception of said clutch pin.

An operating screw 122 is slidably carried by the arm 117 so that it may be shifted into and out of engagement with the clutch pin 118. The clutch pin is provided with a threaded opening 123 at one end so that the screw 122 may be connected thereto for shifting the clutch as aforesaid. A spring loaded detent 124 is provided for holding the clutch pin in its various positions as will be seen in Fig. 14. A set screw 125 provides for releasably holding the screw 122 against longitudinal movement as desired.

It is now apparent that this variable speed sectional cone pulley may be substituted for the usual cone pulley and by reason of the planetary gearing and sectional construction will make possible a greater variety of speeds and a particularly desirable changing of speeds without shifting the belt although further speed changes may be accomplished by the usual placing of the belt in different pulley grooves.

It should be noted that the flat face 14 on the sleeve and the cooperating member 15 on the spindle housing are spaced from the axes of the sleeve and housing respectively, distances not greater than the diameters of said sleeve and housing. In other words, the sleeve and housing have cooperating flat joint faces formed as integral parts thereof and directly on their outer sides rather than on parts or elements which extend outwardly therefrom as has heretofore been the practice. This particular close coupling of the sleeve, overarm and spindle housing makes for the desired increased rigidity and accuracy and provides a condition in which the lever arm of distorting stresses is reduced to minimum, wherefore a complete milling or other operation may be made with one cut and greater accuracy of operation is assured in all positions of the tool.

I claim:

1. A milling machine attachment comprising: a spindle housing, a quill movable axially of and in said housing, a spindle rotatably supported in the quill so as to be bodily moved therewith whereby a tool on the spindle may be fed to the work, an extension on said quill, an apertured extension on said housing, a screw fixed to the quill and extending freely through the aperture in the extension of the housing and a stop member adjustable on the screw and disposed to engage the extension on the housing for controlling the feeding of the quill and spindle, said stop member being splined to said screw, and an adjusting nut threadedy engaged with said screw and rotatably coupled with said stop member for moving said member along said screw.

2. A milling machine attachment comprising: a spindle housing, a quill movable axially of and in said housing, a spindle rotatably supported in the quill so as to be bodily moved therewith whereby a tool on the spindle may be fed to the work, an extension on said quill, an apertured extension on said housing, a screw fixed to the quill and extending freely through the aperture in the extension of the housing and a stop member adjustable on the screw and disposed to engage the extension on the housing for controlling the feeding of the quill and spindle, said stop member being splined on said screw by a means including a set screw which is also operable for holding the stop member in set position, an adjusting nut threadedly engaged with said screw and having an annular groove therein, and a set screw on the stop member engaged in said groove for rotatably coupling the nut with the stop member.

JAMES H. RICHARDS.